United States Patent [19]

Guillemet et al.

[11] Patent Number: 5,473,853
[45] Date of Patent: Dec. 12, 1995

[54] CORNER ASSEMBLY AND FRAME COMPRISING SUCH ASSEMBLY

[75] Inventors: Guy Guillemet, Tenebonne; Marcus Redburn, Burlington, both of Canada

[73] Assignee: Bay Mills, Ltd., Ontario, Canada

[21] Appl. No.: 344,218

[22] Filed: Nov. 23, 1994

Related U.S. Application Data

[63] Continuation-in-part of Ser. No. 122,887, Sep. 16, 1993, Pat. No. 5,431,211.
[51] Int. Cl.$^6$ ...................................................... E04B 1/00
[52] U.S. Cl. ................... 52/745.16; 52/656.7; 52/656.9; 52/202; 403/295; 403/402; 160/105; 160/381
[58] Field of Search .............................. 52/656.9, 656.2, 52/656.5, 656.7, 656.6, 202, 458, 208, 397, 745.15, 745.16, 745.19, 745.2, 745.13; 402/295, 402; 160/105, 381

[56] References Cited

U.S. PATENT DOCUMENTS 4,296,587 10/1981 Berdan ............................... 562/656.9 X
4,665,676 5/1987 Drzemala ............................... 52/656.9

Primary Examiner—Lanna Mai
Attorney, Agent, or Firm—Paul & Paul

[57] ABSTRACT

Corner members and frame members forming an assembly is provided, for holding a screen or the like, in which the corner members have arms disposed to be connected to frame members, preferably by being telescopically received therein, for facilitating retaining the frame assembly, which is a removable assembly, inside a fixed frame of a window. Upper corner members of a moveable frame have a U-shaped attachment means formed by an upwardly projecting flange and tab forming U-shaped channels. The top of the frame having the U-shaped attachment means is inserted at an angle into a downwardly projecting lip means on a fixed frame such that the U-shaped attachment means loosely embraces the lip means. The moveable frame is rotated until the U-shaped attachment means fully embraces the lip means, the moveable frame is flush with fixed frame, and the moveable frame is locked into position against the fixed frame with retaining mechanisms on the remaining two corners of the moveable frame.

6 Claims, 5 Drawing Sheets

CORNER ASSEMBLY AND FRAME COMPRISING SUCH ASSEMBLY

This application is a continuation-in-part of application Ser. No. 08/122,887 filed Sep. 16, 1993, now U.S. Pat. No. 5,431,211.

BACKGROUND OF THE INVENTION

In the art of window manufacture, it is known to provide windows with fixed frames, in which movable frames are disposed. The movable frames may carry screening therein, for ventilation purposes.

It is also known, in the art of window manufacture, that movable frame assemblies are disposed within fixed frame assemblies, for raising or lowering screens or the like, for pivotally moving screens or the like, for facilitating placement, cleaning, or for any other purposes and/or for adjustment of the position of the movable frame assembly that comprises the screen or the like, within the fixed frame.

One example of a prior art type of frame corner bracket is disclosed in U.S. Pat. No. Des. 307,078 dated Apr. 10, 1990, which represents a corner bracket for holding an insect screen, or the like, that may be inserted into an exterior frame.

THE PRESENT INVENTION

The present invention is directed toward providing a frame assembly that includes a corner assembly for an insect screen, or the like, in which means are provided for efficiently providing a retaining mechanism for retaining the movable frame assembly into a fixed frame, for any of various purposes, such as for securement of the movable frame in a retained position, for facilitating a desired position of the movable frame assembly relative to a fixed frame, etc.

Accordingly, it is a primary object of this invention to provide a novel corner assembly and frame comprising such assembly, in which a frame assembly for a screen or the like is provided with a slidable locking mechanism.

It is another object of this invention to provide a corner assembly for a removable frame, in accordance with the foregoing object.

it is another object of this invention to provide an efficient retaining mechanism of the slide type, for use with a corner assembly for a movable or removable frame assembly for a screen or the like.

It is another object of this invention to provide an alternate embodiment of a novel corner member and frame comprising such member, in which the frame member is provided with a flange and tab that form a U-shaped channel which embraces a lip means in a fixed window frame.

It is another object of this invention to provide a corner member for a removable frame, in accordance with the foregoing object.

It is another object of this invention to provide an efficient retaining mechanism, having a mounting means wherein U-shaped attachment means in a moveable frame embrace lip means in a fixed frame, for use with a corner member for a moveable or removable frame assembly for a screen or the like.

Other objects and advantages of the present invention will be readily understood, upon a reading of the following brief descriptions of the drawing figures, detailed descriptions of the preferred embodiments, and the appended claims.

DESCRIPTION OF THE PREFERRED EMBODIMENTS

Figure 1:
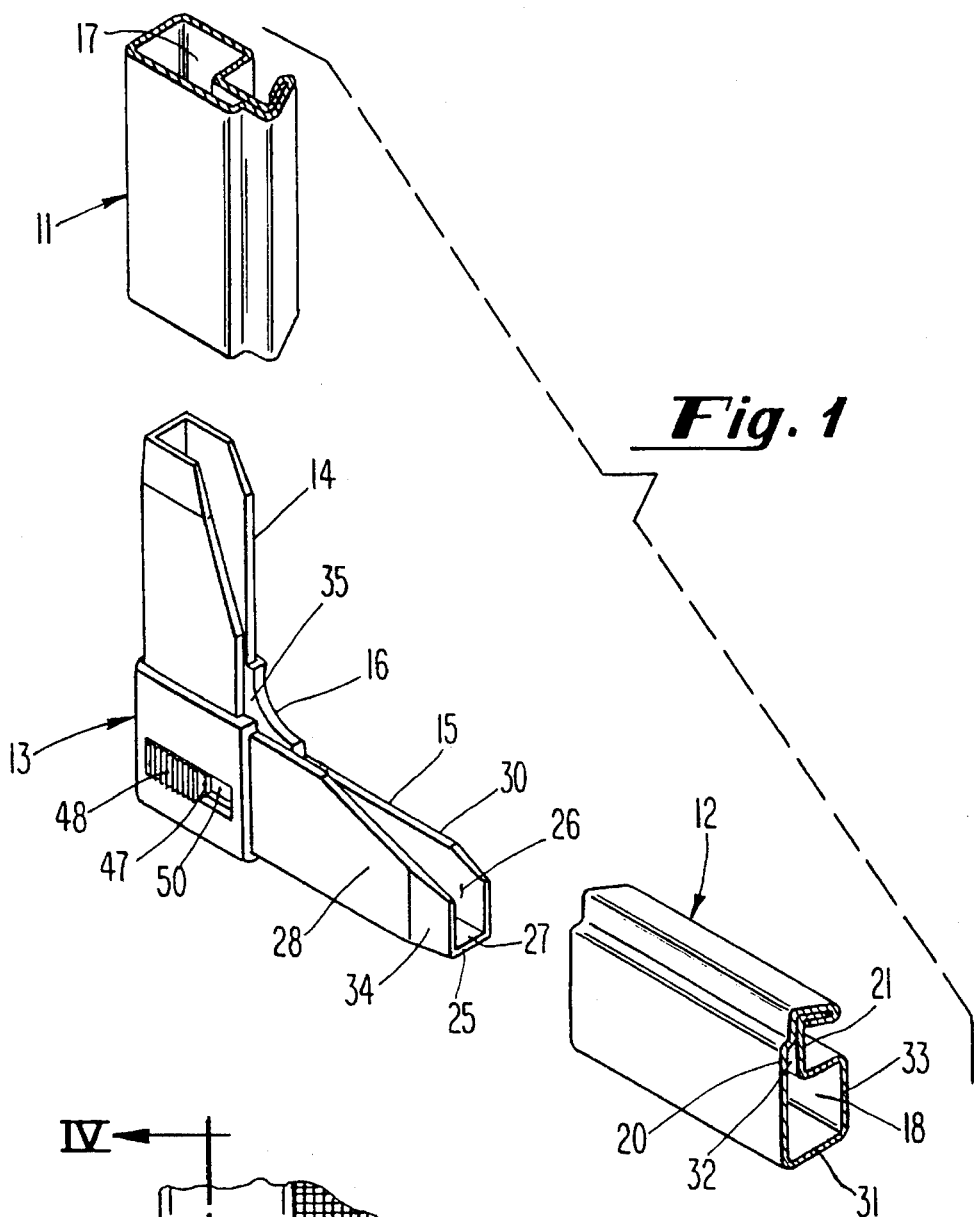
FIG. 1 is a fragmentary, perspective, exploded view of the corner assembly of this invention and portions of side members of a movable or removable frame, to which the corner assembly is connected.
Figure 2:
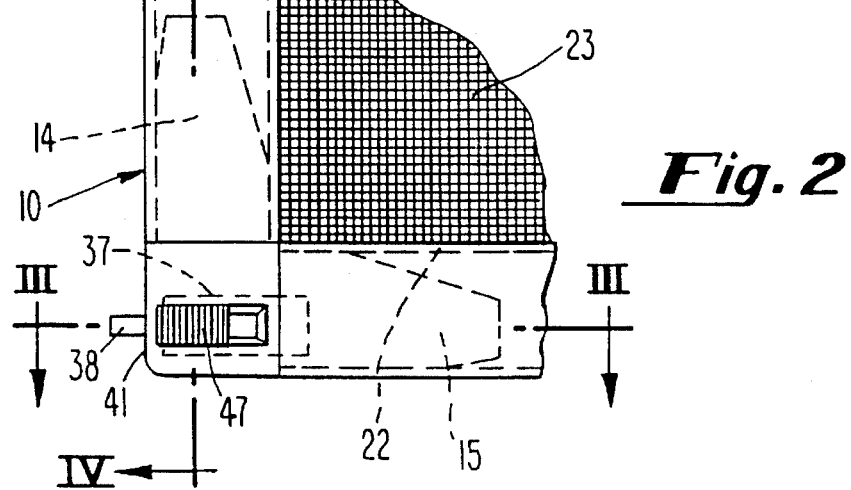
FIG. 2 is a fragmentary front view of a lower left corner of a movable or removable screen frame assembly, including a corner assembly, in accordance with this invention.

Referring now to the drawings in detail, reference is first made to FIG. 1, wherein the movable frame assembly that is shown in FIG. 2, is seen as comprising a pair of side frame members 11 and 12, generally disposed about 90° apart, and a corner assembly 13.

The corner assembly 13 has a pair of connector arms 14, 15 extending outwardly from a corner connector portion 16, generally at 90° relative to each other as shown, for facilitating telescopic receipt of the arms 14, 15, into corresponding channels or other openings 17, 18, respectively, of the frame side members 11, 12, which telescopic receipt of such arms 14, 15 is thus shown in the dotted line showing for the arms in FIG. 2.

The cross-sectional configuration for the frame side members 11, 12, may be of the roll formed or extruded U-shaped construction 20, 21 shown for example, in FIG. 1, for the frame side member 12, with the channel 18 opening upward, as shown, for receipt therein of a peripheral bead 22 for a screen 23 (see FIG. 2) therein, as shown. It will be understood that there will preferably be four such frame side members 11, 12, comprising the periphery of the movable or removable frame 10, with retaining corner assemblies 13, preferably at each of the four corners thereof.

Each arm 14, 15 of the corner assembly 13 will preferably also have a U-shaped configuration 25, opening into a channel 26, as shown in FIG. 1, including a base 27, arms 28, 30 adapted to be resiliently received in gripping telescopic relation within side members 11, 12. In the particular arrangement shown, the portions 27, 28 and 30 of the arm 15 are respectively received within zones 31, 32, 33 of frame side member 12 as shown in FIG. 1. It will be noted that the outer end of each of arm portions 27, 28 and 30 is chamfered as shown at 34.

It will also be understood that the arm 14 is constructed generally similar to that of 15, as shown, for likewise telescopic connection to the frame side member 11.

Figure 3:
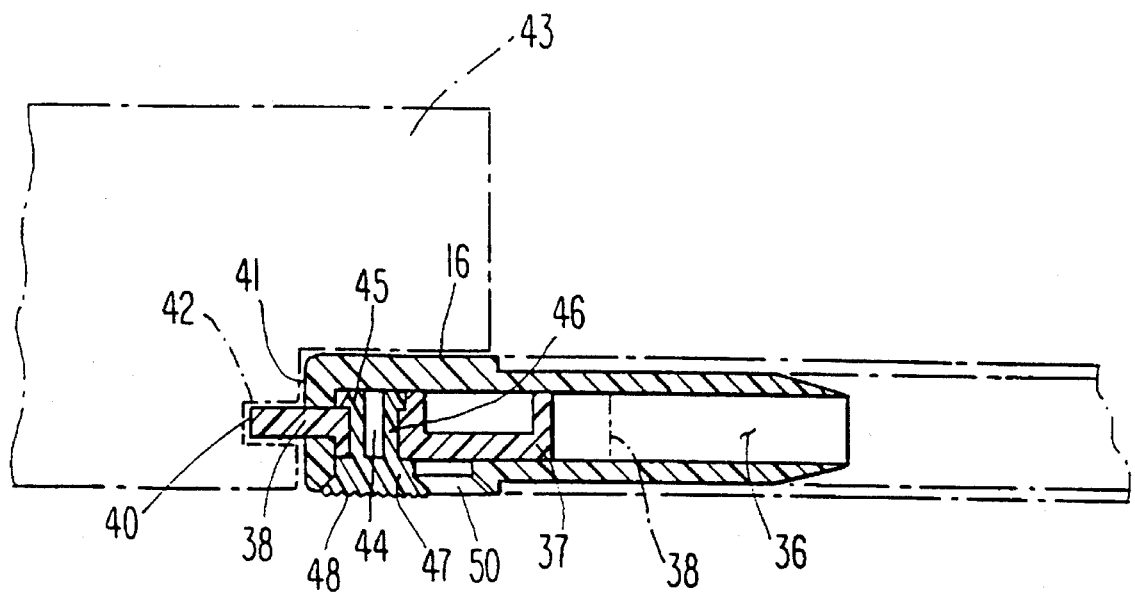
FIG. 3 is a horizontal, sectional view taken through the corner assembly shown in FIG. 2, generally along the line III—III of FIG. 2, with the retaining protrusion of the corner assembly being shown disposed in retaining relation in a portion of a fixed frame assembly, that in turn, is illustrated in phantom in FIG. 3.
Figure 4:
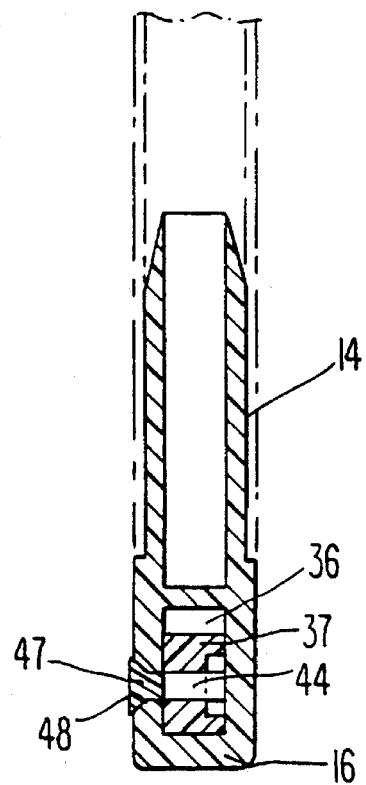
FIG. 4 is a vertical sectional view taken through the corner assembly of FIG. 2, generally along the line IV—IV of FIG. 2.

At the left end of the U-shaped opening 26 of the arm 15, and continuing into the interior 35 of the corner junction 16, is a slideway 36, as shown in FIG. 4. The slideway 36 houses therein a slide member 37, movable therein between the full line position therefor shown in FIG. 3 and the phantom line position therefor 38, also shown in FIG. 3, with the slide member 37 being of generally rectangular configuration, as shown in dotted lines in FIG. 2.

Fixedly carried on the left end of the slide member 37, and preferably unitary therewith, is a retaining protrusion 38, such that when the slide member 37 has its right-most end as shown in FIG. 3 in the phantom line position 38 illustrated in FIG. 3, the left-most end 40 of the retaining protrusion 38 is either even with the left-most end 41 of the corner connector 16, or is slightly sunken (not shown), relative thereto, such that it does not protrude outwardly thereof. When the slide member 37 is in the full line position therefor shown in FIG. 3, the retaining protrusion 38 is in the extended position shown in FIG. 3, adapted to be engaged within a recess 42 in a fixed frame member 43, preferably disposed about the movable or removable frame member 10, in which the movable or removable frame member 10 will preferably be received.

Alternatively, the slide member 37 could be of multiple-piece construction, such as in the form of a two-piece snap-in arrangement, not shown herein.

A slot 44 is provided in the slide member 37, in which a pair of locking tangs 45, 46 of a button 47 are received, in resilient engagement therewith, as shown in FIG. 3, with the button 47 having a manually engagable, slightly protruding and/or knurled outer surface 48, for engagement by preferably the thumb of a user, for sliding the slide member 37 within the slideway 36, by engaging the surface 48 of the button 47 and moving the same leftward and rightward within its guideway 50 as shown in FIG. 3.

Thus, it will be seen that the slide member 37 moves parallel with and within the slideway 36, upon movement of the button 47 within its guideway 50, also parallel therewith.

It will also be seen that the corner assembly of FIGS. 1–4, is preferably constructed of only three components; namely, the corner connector 16 with its extending arms 14 and 15 comprising one component, with the slide member 37 comprising another component, and with the retaining button 47 comprising the third component. Alternatively, the corner assembly could be made of a fewer or greater number of components.

Figure 5:
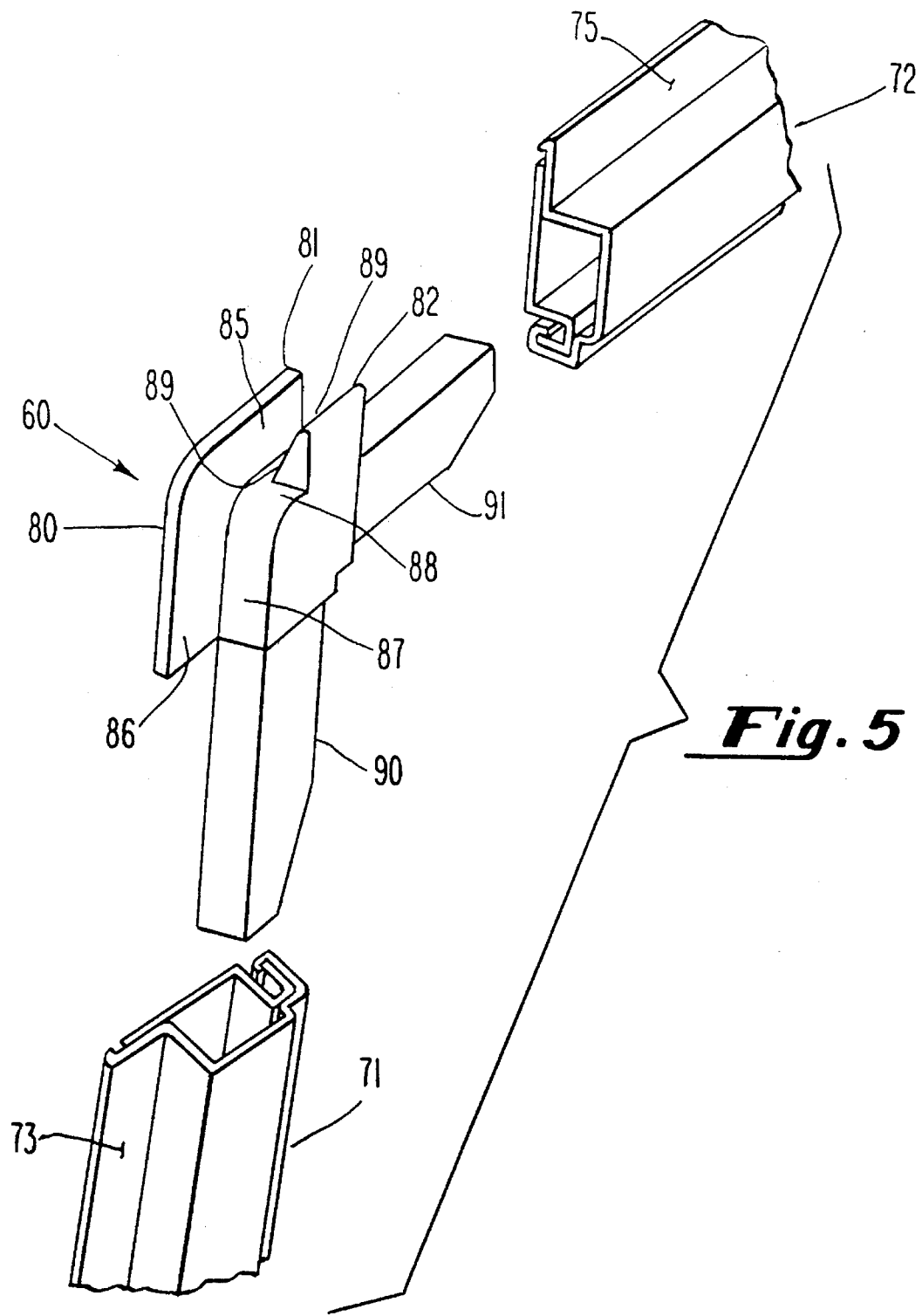
FIG. 5 is a fragmentary, perspective, exploded view of the corner member of a second embodiment of this invention and portions of side members of a movable or removable frame assembly to which the corner member is connected.
Figure 6:
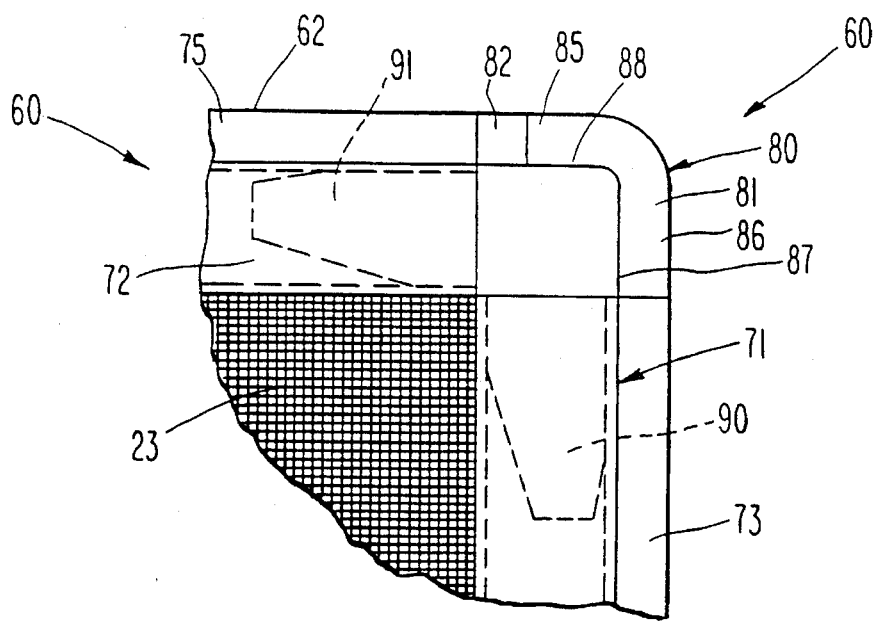
FIG. 6 is a front view of the embodiment of FIG. 5 (opposite corner) a corner of a movable or removable screen frame assembly, including a corner member, in accordance with this invention.

FIGS. 5–9 show a second embodiment of a corner member of the present invention. The second embodiment, as seen in FIGS. 5 and 6, is seen as a moveable or removable frame assembly 60 comprising side and top frame members 71, 72, respectively, generally disposed about 90° apart and connected by attachment corner members 80. Connected to a corner member 80 are first and second arms 90, 91 adapted to be received in frame members 71 and 72. It is understood that the arms 90, 91 are of similar construction to that of the arms 14, 15 of the first embodiment, as in FIG. 1. Additionally, it is understood that frame members 71, 72 are of similar construction to the corresponding frame members of the first embodiment 11, 12, but contain additional flanges 73, 75 to mate with the flanges of the corner members of the embodiment of FIGS. 5–9, aesthetically framing the four sides of the moveable frame assembly 60, and potentially providing a sealing function against adjacent frame surfaces (unmarked) of fixed frame assembly 92 (see FIG. 9).

The corner member 80 has a corner junction with upper surface 88 and side surface 87 generally perpendicular to one another. The upper and side surfaces 88, 87 are generally perpendicular to the axes of, and opposite to (across the junction) the two connector arms 90, 91 respectively. Integral to the corner junction are a flange 81 and a tab 82, each with an inner and outer surface. The flange 81 comprises protruding flange members 85, 86 on the upper and side surfaces 88, 87 of the corner member opposing the connector arms 90, 91. The flange members 85, 86 are parallel to a plane formed by the axes of the connector arms 90, 91. Also integral to the corner member 80 is tab 82 upwardly disposed on the upper surface 88 of the corner member 80 such that an upwardly opening U-shaped channel 89 is formed by the upper surface 88 of the corner member 80, the inner surface 61 of tab 82, and the inner surface 63 of upper protruding flange member 85 (see FIGS. 7 and 8).

Figure 9:
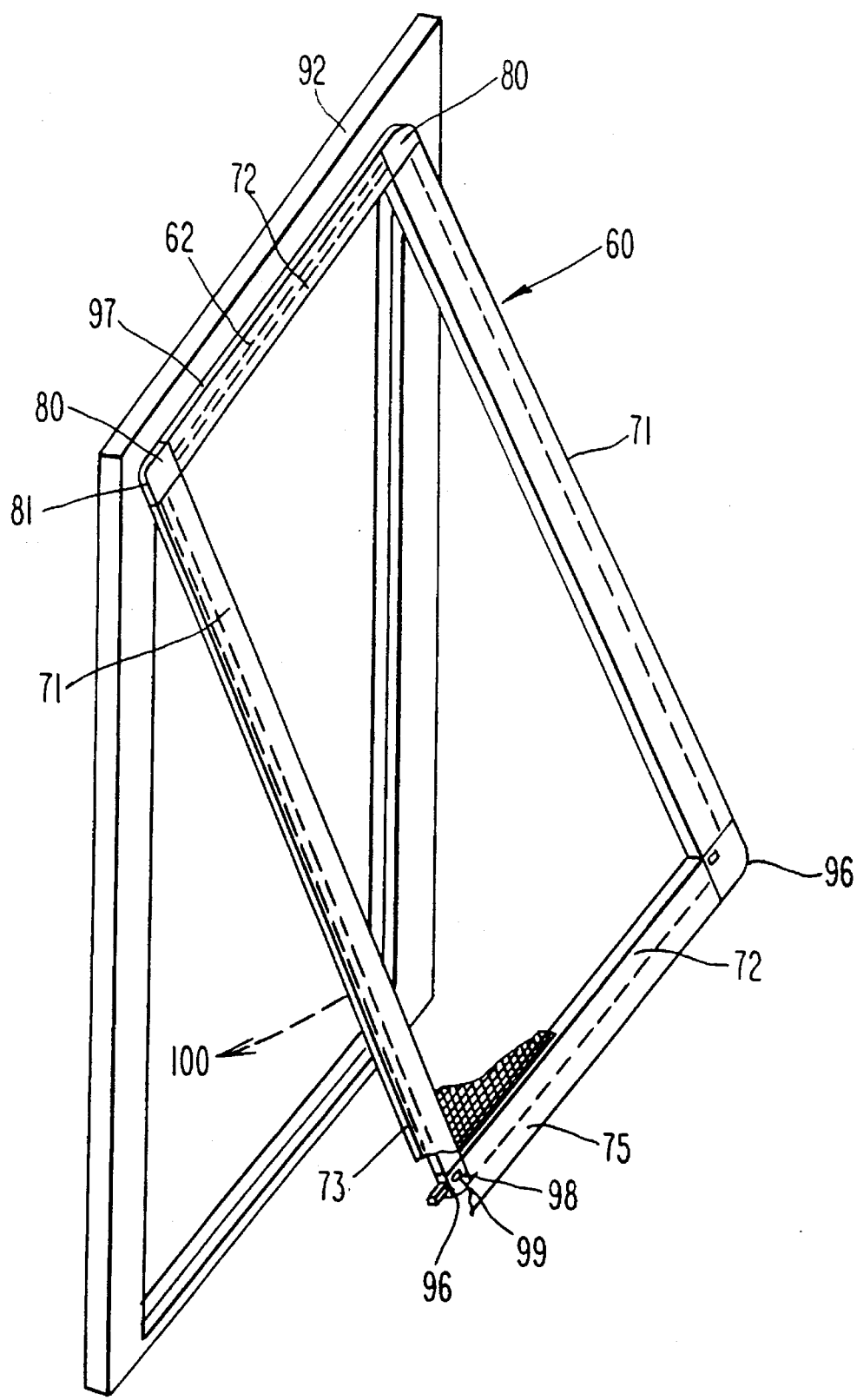
FIG. 9 is a perspective view, partially cut away of a moveable frame using corner members of the embodiment of FIGS. 5–8, with the moveable frame shown in a position prior to mounting.

In a moveable frame assembly 60, two corner members 80 are preferably disposed on the top side 62 (FIG. 9) of the frame assembly 60 such that the upwardly opening U-shaped channels 89 matably embrace opposite sides of a downwardly extending lip means 94 of a fixed frame assembly 92. See FIG. 7–8. The corner members 80 are used in a moveable frame 60 in pairs, with each one in a pair, the mirror image of the other, as shown in FIG. 9. Thus, since the moveable frame 60 of FIGS. 5–9 has two such corner members 80, one at each upper corner of a moveable frame assembly 10, there will be a left and a right corner member 80, each with a flange 81 and a tab 82 on the top side 62 of the moveable frame assembly 60 (FIG. 9).

In the embodiment of FIGS. 5–9 (moveable frame assembly 60), the lower two corner assemblies 96 each have a slide member 98 in a slideway 99 as in the first embodiment (FIGS. 1–4), but also have a flange, similar to the flange 81 of the corner members 80 that mate with side member flanges 73, 75.

Figures 7, 8:
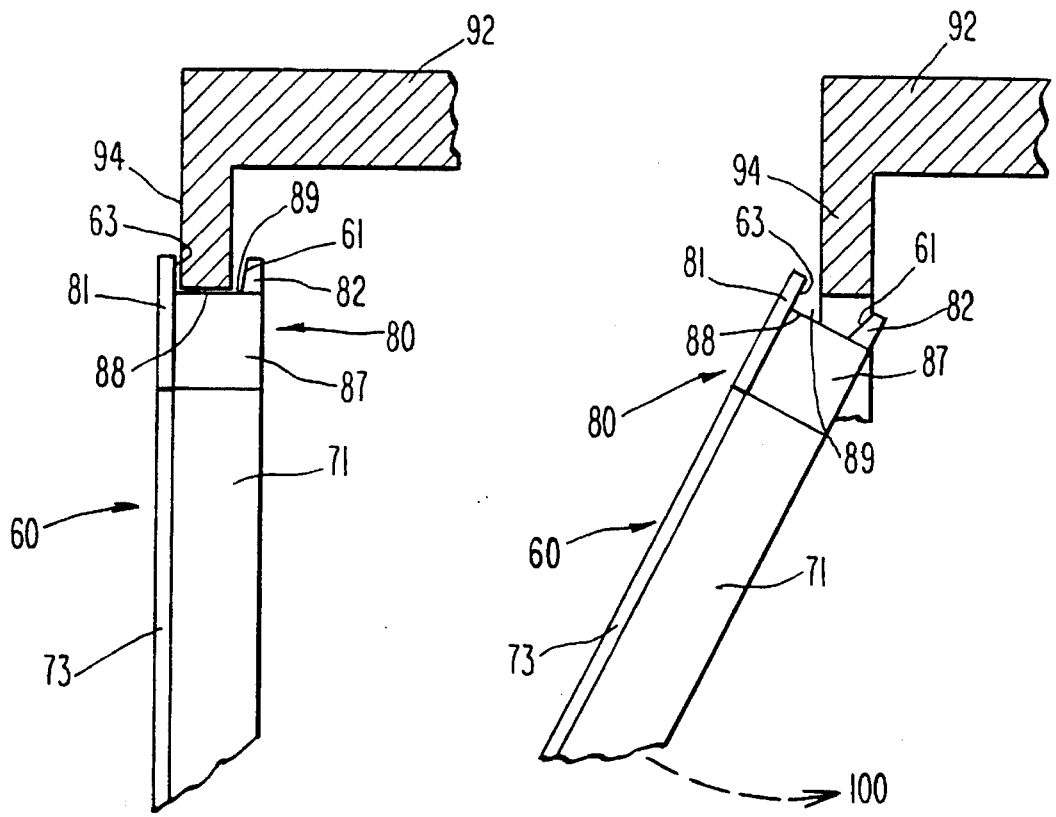
FIG. 7 is a vertical side view taken of the moveable frame assembly, with a corner member of FIG. 5, showing a sectional view of a fixed frame assembly, with the moveable frame assembly in a mounted position.
FIG. 8 is a vertical side view taken of the moveable frame assembly with a corner member of FIG. 5, showing a sectional view of a fixed frame assembly, with the movable frame shown in a position prior to mounting.

During the mounting process of the moveable frame assembly 60 to a fixed frame assembly 92, the top 97 of the movable frame 60 containing the tab and flange type attachment corner members 80 is oriented such that the U-shaped channel 89 can mate with the lip means 94 of the fixed frame assembly 92. The moveable frame assembly 60 is held at an angle to the fixed frame assembly 92 such that the moveable frame assembly 60 is partially and loosely engaged with the fixed frame assembly 92 by means of the upwardly opening U-shaped channel 89 of the moveable frame 60 embracing the downwardly protruding lip means 94 of the fixed frame assembly 92 (FIGS. 8 and 9). The moveable frame assembly 60 is then rotated downward, pivoted in the direction of arcuate line 100 from the point of contact of the U-shaped channel 89 with lip means 94 (FIG. 8). When the moveable frame 60 is rotated downward, it becomes fully seated in position against the fixed frame assembly 92 as shown in FIG. 7. The upwardly opening U-shaped channel 89 of the moveable frame assembly 60 fully embraces the downwardly extending lip means 94 of the fixed frame assembly 92. In the embodiment of FIGS. 5–9, the lower two corner assemblies 98 each have a slide type retaining mechanism in which slide member 98 slides in slideway 99 to lock the moveable frame assembly 60 in place in the fixed frame assembly 92, in essentially the same manner as the locking that occurs with the slide members 37 at the bottom corners of the embodiment of FIGS. 1–4.

It will be understood that the device of the present invention may be constructed such that the components of the corner assembly are of thermoplastic construction, which lends itself to ready slidability of the sliding components within their slideways/guideways; that the corner assemblies are readily adaptable for insertion into side frame members that are of any compatible construction, such as aluminum, steel, vinyl or other appropriate materials, and which lend themselves to adaptation to various color schemes, or the like. It will further be understood that various modifications may be made in the details of constructions, as well as in the use and operation of the components of the present invention, all within the spirit and scope of the invention as defined in the appended claims.

We claim:

1. A frame assembly for a screen or the like, comprising a plurality of frame members and four corner members;

said four corner members including two adjacent attachment corner members each having a corner junction;

each said corner junction comprising a first and a second connector arm, an upper surface, and a side surface;

said first and second connector arms being disposed at approximately 90° relative to each other and each being received in telescopic relation with a corresponding frame member;

said upper surface being disposed opposite and generally perpendicular to said first connector arm;

said side surface being disposed opposite and generally perpendicular to said second connector arm;

said upper surface having an integral, generally upwardly opening U-shaped attachment means, generally parallel to said second connector arm, for embraceable attachment to, and receipt therein of a downwardly extending lip means disposed in a fixed window frame.

2. The frame assembly of claim 1, wherein said U-shaped attachment means comprises a U-shaped channel, said channel being generally parallel to said second connector arm and bounded by a flange disposed on said corner junction, extending upwardly from said upper surface of said corner junction and a tab disposed on said corner junction, extending upwardly from said upper surface of said corner junction.

3. The frame assembly of claim 2 wherein said flange is disposed along substantially the entire upper surface of said corner junction and additionally disposed along substantially the entire side surface of said corner junction, and wherein each said frame member has a protruding flange on an outer surface, wherein said flange on said each corner member and said protruding flanges on said frame members, taken together form a substantially continuous, aesthetic flange structure about said frame assembly.

4. The frame assembly of claim 1 wherein said four corner members additionally include two adjacent retaining corner members comprising:

a corner connector having a corner junction and a pair of connector arms disposed at approximately 90° relative to each other and each arm being received in telescopic relation with a corresponding frame member;

with the corner connector having a slideway therein, disposed parallel to, and at least partially within one of its said arms;

with a slide member carried in said slideway, in sliding engagement therewith between extended and retracted positions therein, with said slide member having a retaining protrusion extending therefrom, in a direction generally parallel to said slideway;

said retaining protrusion extending in protruding relation beyond said corner junction in the extended position of said slide, and being substantially entirely disposed in retracted relation within said corner junction in the retracted position of said slide; and including a retaining button carried by said slide member and being adapted to be manually engaged by a user for moving said slide member between extended and retracted positions thereof.

5. The frame assembly of claim 1, wherein the corner member is comprised of a one-piece integral thermoplastic unit.

6. A method of mounting a four-sided moveable frame for a screen or the like that comprises a plurality of frame members, two adjacent corner members having upwardly opening U-shaped attachment means, and two adjacent corner members having retaining mechanisms, to a fixed frame having a downwardly extending lip means, comprising:

orienting said moveable frame relative to said fixed frame such that said U-shaped attachment means is matably positioned relative to said downwardly protruding lip means in said fixed window frame;

holding said moveable frame at an angle relative to said fixed frame such that said U-shaped attachment means of said moveable frame partially and loosely embraces said lip means of said fixed window frame;

rotating said moveable frame relative to said fixed frame until said moveable frame is brought generally parallel to, and seated in, said fixed frame wherein said U-shaped attachment means fully embraces said lip means;

locking said retaining mechanisms;

whereby said movable frame is retained in position against said fixed frame by said U-shaped attachment means embracing said lip means and by said retaining mechanisms in a locked position.

\* \* \* \* \*